Nov. 15, 1966 G. B. SHIELDS 3,285,610

MAGNETIC RECORDER CARTRIDGE LOCK DOWN MECHANISM

Filed Sept. 9, 1960 5 Sheets-Sheet 1

Inventor
George B. Shields

By Hill, Sherman, Meroni, Gross & Simpson Attys.

Nov. 15, 1966 G. B. SHIELDS 3,285,610

MAGNETIC RECORDER CARTRIDGE LOCK DOWN MECHANISM

Filed Sept. 9, 1960 5 Sheets-Sheet 2

Inventor
George B. Shields

By Hill, Sherman, Meroni, Gross & Simpson
Att'ys.

Nov. 15, 1966 G. B. SHIELDS 3,285,610

MAGNETIC RECORDER CARTRIDGE LOCK DOWN MECHANISM

Filed Sept. 9, 1960 5 Sheets-Sheet 3

Inventor
George B. Shields by Hill, Sherman, Meroni, Gross & Simpson Attys.

Inventor
George B. Shields

By Hill Sherman Meroni Gross & Simpson Attys.

MAGNETIC RECORDER CARTRIDGE LOCK DOWN MECHANISM

Filed Sept. 9, 1960 5 Sheets-Sheet 5

Inventor
George B. Shields

By Hill, Sherman, Meroni, Gross & Simpson
Attys

United States Patent Office 3,285,610
Patented Nov. 15, 1966

3,285,610
MAGNETIC RECORDER CARTRIDGE LOCK DOWN MECHANISM

George B. Shields, Columbus, Ohio, assignor, by mesne assignments, to Dage-Bell Corporation, a corporation of Delaware Filed Sept. 9, 1960, Ser. No. 54,986
4 Claims. (Cl. 274—4)

This invention relates to magnetic tape recorders and, more particularly, to a stereo tape cartridge type magnetic tape recorder.

A magnetic tape recorder constructed in accordance with this invention incorporates several unique features which enable this tape recorder to be sturdily and economically constructed and have improved performance characteristics.

Accordingly, it is an object of this invention to provide a magnetic tape recorder having novel means for automatically locking a magnetic tape cartridge in place on the tape recorder when it is at its record-playback position only.

It is another object of this invention to provide a magnetic tape recorder having a novel speed change mechanism.

It is another object of this invention to provide a magnetic tape recorder having novel means for adjusting the positions of the head.

It is another object of this invention to provide a magnetic tape recorder having novel means for adjusting the pressure applied by the pressure pads on the heads and the pressure applied by the brake pads on the reel hubs at the various positions of the tape recorder.

It is another object of this invention to provide a tape recorder having novel means for adjusting the pressure applied by the pressure pads and the brake pads and for disengaging the pinch roller from the capstan shaft when the recorder is intermediate the playback and fast forward positions.

It is another object of this invention to provide a tape recorder having novel means for temporarily stopping the travel of the tape and braking the tape while the recorder is at its record-playback position.

It is another object of this invention to provide a magnetic tape recorder having self aligning pressure pads and pinch roller.

It is another object of this invention to provide a magnetic tape recorder having a novel mute switch and means for actuating the switch.

It is another object of this invention to provide a magnetic tape recorder having a drive belt which can be replaced without disassembling any of the other parts of the tape recorder.

Other objects, features and advantages of the present invention will be apparent from the following detailed description taken in conjunction with the accompanying figures of the drawings, in which.

As shown on the drawings.

Figure 1:
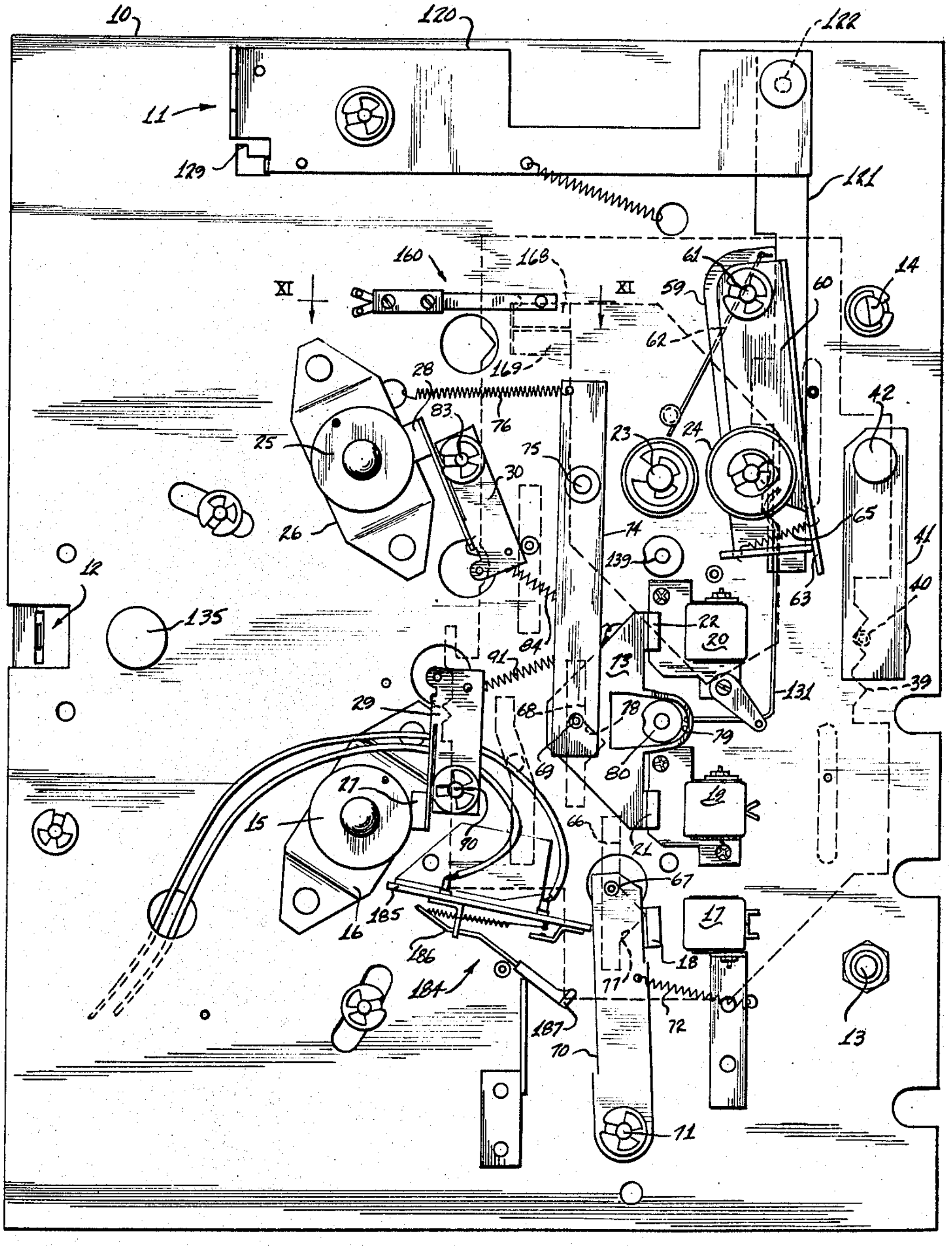
FIGURE 1 is a front view of a magnetic tape recorder constructed in accordance with the invention showing the deck plate and the components mounted thereon.
Figure 2:
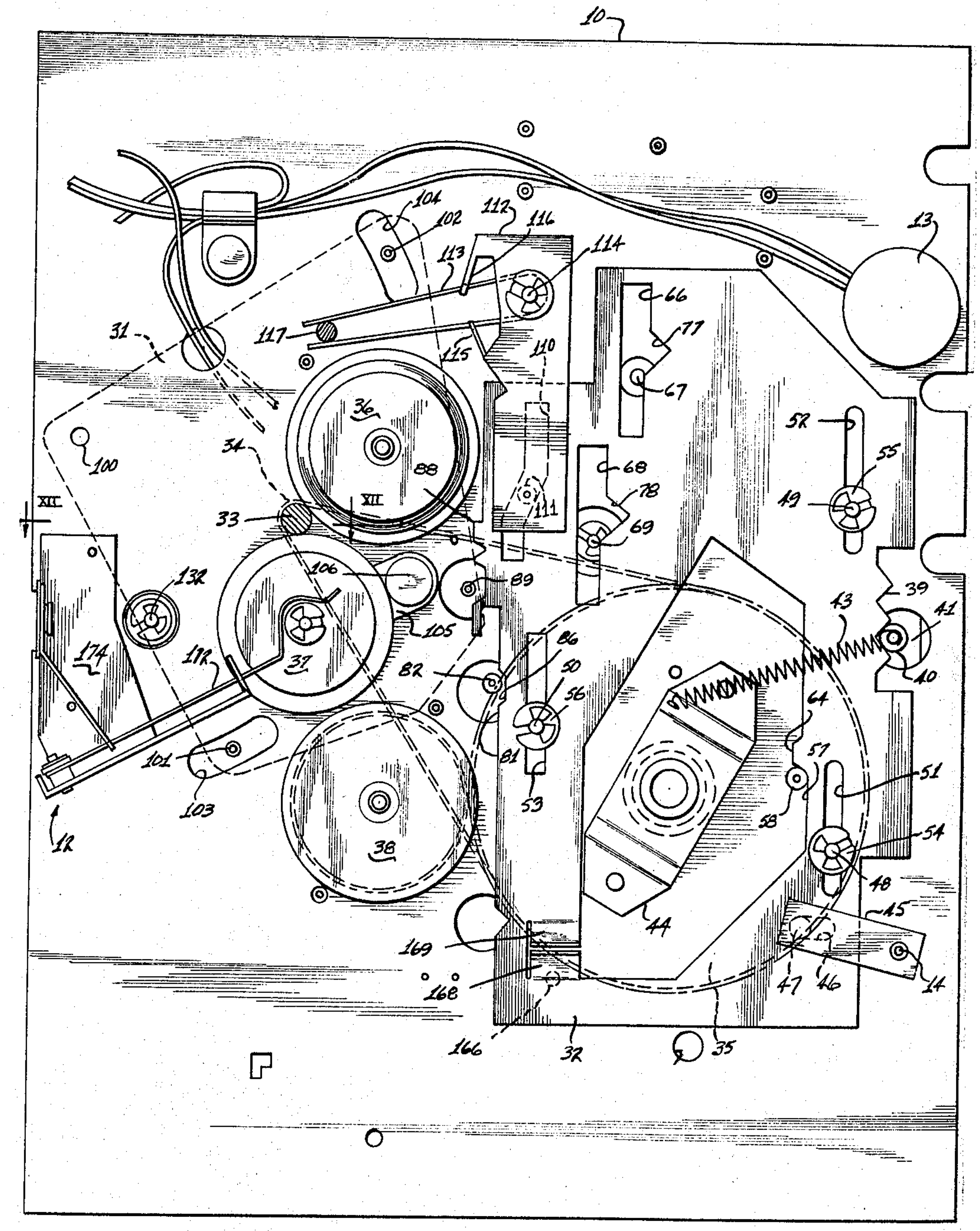
FIGURE 2 is a back view of the deck plate and components illustrated in FIGURE 1.
Figures 3, 7:
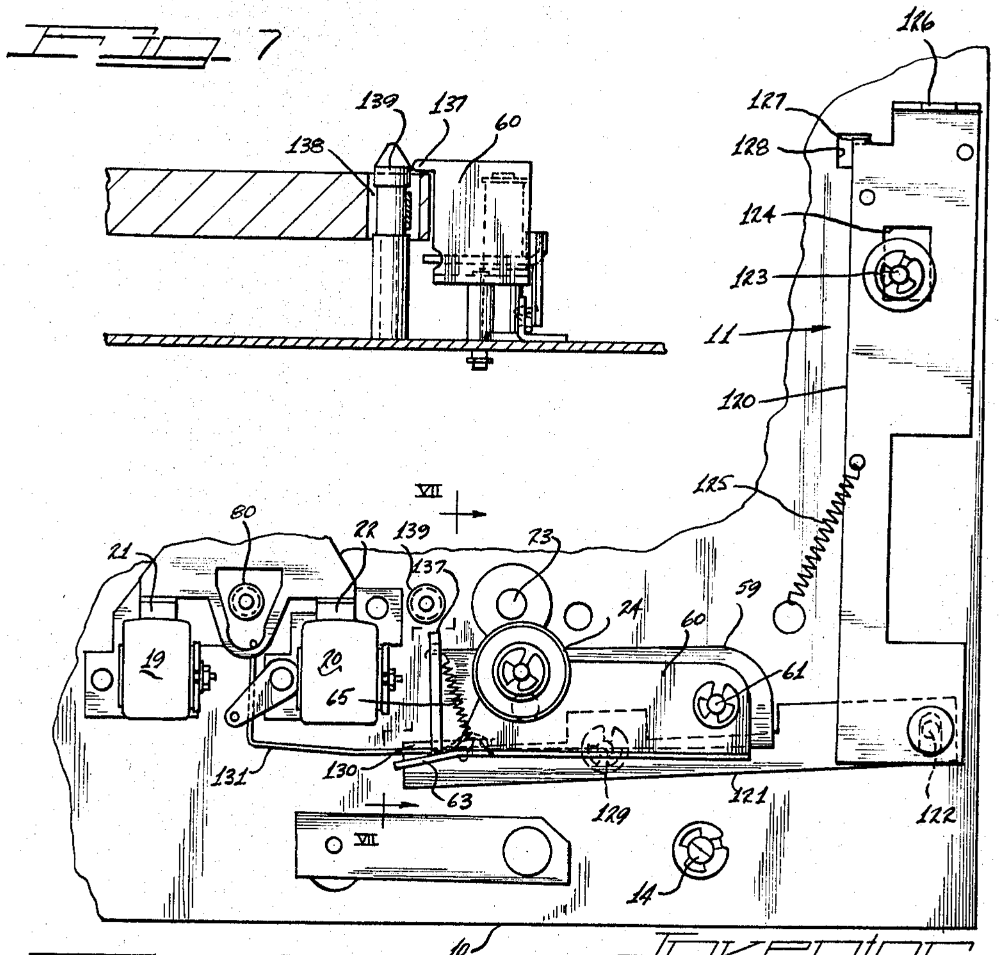
FIGURE 3 is a front view of a portion of the deck plate and components in greater detail.

With reference to FIGURES 1–3, the magnetic tape recorder includes a deck plate 10 that supports most of the components making up the recorder. Mounted on the plate 10 are the controls for the recorder which include a pause actuator control 11, a speed change control 12, a power on-off switch 13, and a position selector mechanism 14. The tape recorder is designed to accommodate an RCA type magnetic tape cartridge in its tape transport path which includes a supply reel hub 15 which is mounted on a bracket 16; an erase head 17 and pressure pad 18; two record-playback heads 19 and 20 and pressure pads 21 and 22; a capstan shaft 23; a pinch roller 24; and a take-up reel hub 25 that is mounted on a bracket 26. Two brake pads 27 and 28 are mounted on two pivotal brake levers 29 and 30 and bear against the hubs 15 and 25, respectively.

With particular reference to FIGURE 2, mounted on the back side of the deck plate 10 are pivotal motor mounting plate 31 (which is shown in phantom in order to illustrate the components mounted behind it) and a cam plate 32. The motor mounting plate 31 is fastened to standoffs on the deck plate 10 and has a drive motor (not shown) resiliently mounted on it. The drive motor shaft 33 is coupled to a flexible drive belt 34 which drives the capstan flywheel 35. Depending on the position of the plate 31, the shaft 33 can also bear against a rubber tired wheel 36 which is connected through a disc clutch to the supply reel hub 15. The shaft 33 can also drive the take-up reel hub 25 through a pivotal rubber idler wheel 37 and a metallic wheel 38. The wheel 38 is connected to the take-up reel hub 25 by another disc clutch.

The cam plate 32 is coupled to the position selector switch shaft 14 in such a manner that when the selector switch is turned to the various recorder positions, the position of the cam plate is changed and it acts to vary the pressure applied on the reel hubs 15 and 25 by the brake pads 27 and 28, the pressure applied on the heads 17, 19 and 20 by the pads 18, 21 and 22, the pressure applied on the capstan shaft 23 by the pinch roller 24, and the position of the motor mounting plate 31. The tape recorder has four primary positions, fast rewind, stop, record-playback, and fast forward. These positions are attained by rotating the shaft 14 which is secured to an index lever 45 which has an elongated slot 46 formed therein. A stud 47, formed on the cam plate 32, extends through the slot 46 so that, as the lever 45 is rotated around the shaft 14, the stud 47 and the cam plate 32 shift their positions. The movement of the cam plate 32 is guided by three shafts 48, 49 and 50, which are fastened to the deck plate 10 and extend through elongated three slots 51, 52 and 53 formed in the cam plate 32. The cam plate 32 is prevented from coming off of the shafts 48, 49 and 50 by conventional retaining rings 54, 55 and 56.

At each of the four recorder positions, the cam plate 32 is held against accidental movement by a cam surface 39 and a cam follower 40. The follower 40 is mounted on a retaining arm 41 which is pivoted at 42, FIGURE 1, and urged in the direction of the cam surface 39 by a spring 43. The spring 43 is fastened between the arm 41 and the bracket 44 for the capstan flywheel 35.

The pinch roller 24 is moved toward and away from the capstan shaft 23 by a cam surface 57 formed on the plate 32 and a cam follower 58. The cam follower 58 is mounted on a lever 59, FIGURES 1 and 3, and the pinch roller 24 is mounted on a pinch roller lever 60, both of the levers 59 and 60 being pivotally mounted on a post 61. The lever 59 is urged to rotate in a counterclockwise direction as seen in FIGURE 1 by a wire spring 62 which is fastened at one end to this lever and bears at its other end against a stud fastened to the deck plate 10 and against the post 61 at a point intermediate its two ends. When the cam follower 58 is on either side of the hill 64, FIGURE 2, the spring 62 is able to rotate the lever 59 so that it bears against an overhanging portion 63 of the lever 60 and draws the pinch roller 24 away from the capstan shaft 23. However, when the cam follower 58 is on the top of the hill 64 the lever 59 is forced in the direction of the capstan shaft 23 and, since the two levers 59 and 60 are coupled together by a spring 65, the pinch roller 24 mounted on the lever arm 60 is forced against the capstan shaft 23. The cam surface 57 and follower 58 are designed so that this condition is attained only when the position selector switch 14 is in the record-playback position.

The position of the pressure pad 18 for the erase head 17 is controlled by a cam surface 66 and a cam follower 67, and the positions of the pressure pads 21 and 22 for the record-playback heads 19 and 20 are controlled by a cam surface 68 and a cam follower 69. The pressure pad 18 and the cam follower 67 are both mounted on a pressure pad arm 70 that is pivotal about a pin 71 and urged in the direction of the head 17 by a spring 72. The two pressure pads 21 and 22 are both mounted on a pressure pad bracket 73 that is pivotally mounted on the cam follower 69 and an arm 74. The arm 74 is also pivotally mounted on a pin 75 and connected to a spring 76 which urges the bracket 73 in the direction of the heads 19 and 20. A portion of the bracket 73 is in the form of a yoke 79 which encircles a tape guide post 80 in order to direct the movement of the bracket 73.

When the cam follower 69 is on either side of a valley 78, the cam surface 68 forces the bracket 73 containing the pressure pads 21 and 22 away from the heads 19 and 20. Only when the follower 69 is within the valley 78 will the spring 76 attached to the lever 74 be able to force the pads 21 and 22 against the heads 19 and 20. Likewise, the pressure pad 18 is pressed tightly against the head 17 only when the follower 67 is within the valley 77. The cam surfaces 66 and 68 and the followers 67 and 69 are designed so that all three pressure pads are against their heads only when the position selector switch 14 is at the record-playback position, and so that the two pads 21 and 22 are also against their heads when the switch 14 is intermediate the record-playback and fast forward positions.

The amount of pressure exerted on the take-up reel hub 25 by the brake pad 28 is controlled by a cam surface 81 and a cam follower 82. This follower 82 and the brake pad 28 are both mounted on the bracket 30 which pivots around a shaft 83 and is connected to a spring 84 which urges the brake pad 28 in the direction of the hub 25. It can be seen that the upper edge of the cam surface 81 will force the follower 82 in a clockwise direction as seen in FIGURE 1 and the pad 28 away from the hub 25, and that the spring 84 will be able to pull the pad 28 into contact with the hub 25 only when the follower 82 is adjacent to the valley 86 formed in the cam surface, which is designed to occur only when the recorder is at its stop position.

Figure 4:
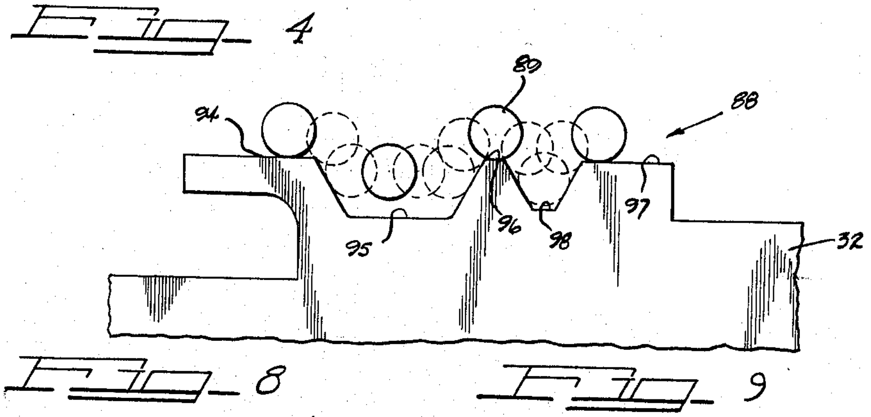
FIGURE 4 is a view of a portion of a cam plate.

The amount of force exerted by the brake pad 27 on the supply reel hub 15 is controlled by a cam surface 88 and a cam follower 89 which are best illustrated in FIGURE 4. The follower 89 and the pad 27 are both mounted on the bracket 29 which is pivoted at 90 and connected to a spring 91 which urges the bracket 29 in a clockwise direction as seen in FIGURE 1. With reference to FIGURE 4, when the cam is designed so that the follower 89 is at the top of the plateau 94 the recorder is at its fast rewind position; when the follower is adjacent the valley 95 the recorder is at its stop position; when the follower is at the top of the hill 96 the recorder is at the record-playback position; and when the follower is on the plateau 97 the recorder is at its fast forward position. Intermediate the record-playback position and the fast forward position is a temporary position where the follower 89 is adjacent the valley 98. At this position, the brake pad 27 is allowed to exert a light braking force on the supply reel hub 15 and slow the tape down when the tape recorder is being switched from the fast forward position to the record-playback position. The position of the valley 98 is such that at this temporary position, the pressure pads 21 and 22 also bear against the heads 19 and 20 and the pinch roller 24 is pulled away from the capstan shaft 23. It can be seen that in this temporary position a slight braking pressure is applied to the hub 15 and to the tape with the result that the motion of the tape is slowed down somewhat before the recorder reaches the record-playback position.

Still another cam surface on the plate 32 acts to change the position of the motor mounting plate 31 and the drive motor. With reference to FIGURE 2, the motor mounting plate 31 is mounted to pivot around a pin 100 which is fastened to the deck plate 10. Two other pins 101 and 102 are inserted through arcuate slots 103 and 104, respectively, and guide the rotary motion of the plate 31. When the tape recorder is switched to its fast rewind position, the motor mounting plate 31 and the shaft 33 are rotated in the counterclockwise direction as seen in FIGURE 2 until the shaft 33 bears against the rubber tired wheel 36 and drives the supply reel hub 15. At this position the motor shaft 33 is out of contact with the idler wheel 37. When the recorder is turned to its stop position the plate 31 is rotated until the shaft 33 is out of contact with both the wheel 36 and the idler wheel 37. Finally, when the tape recorder is switched to either its record-playback or its fast forward positions the plate 31 is rotated until the shaft 33 bears against the idler wheel 37. This wheel 37 is mounted on a lever 105 and is pivotal about the pin 106 so that the pressure exerted by the shaft 33 against the wheel 37 forces the wheel 37 against the take up drive and causes both of the wheels 37 and 38 to rotate.

The plate 31 and the shaft 33 are caused to rotate to these positions by a cam surface 110 formed in the plate 32, a cam follower 111 that is attached to a motor shift lever 112, and a stiff U-shaped wire 113. The lever 112 is pivotally mounted on a shaft 114 and the wire 113 is mounted around the shaft 114 and held in place by means of two braces 115 and 116 formed on the lever 112. In operation, when the cam plate 32 is moved from one position to another the cam follower 111 follows the surface 110 and pivots about the shaft 114, which causes the wire 113 to bear against a stud 117 formed on the motor mounting plate 31 and pivots this plate around the pin 100. For example, if the cam plate 32 is moved in a downward direction as seen in FIGURE 2, the lever 112 will pivot in a counterclockwise direction and the wire 113 will pivot the motor mounting plate 31 in a clockwise direction.

The magnetic tape recorder also includes a pause actuating mechanism which is best illustrated in FIGURES 1 and 3. This mechanism operates in such a manner that when the recorder is at its record-playback position the motion of the tape can be temporarily stopped and the tape braked without changing the tape recorder from its record-playback position. This mechanism includes a pause actuator lever 120 and a pause lever 121 which are hinged together at 122. The actuator lever 120 is loosely mounted on the deck plate 10 by a shaft 123 that is inserted through an enlarged opening 124 in the lever 120, and it is urged in a downward direction as seen in FIGURE 3 by a spring 125. At the upper end of the actuator lever 120 is an outwardly extending handle 126 and an inwardly extending hook 127 which extends through an opening 128 formed in the deck plate 10. One side of the opening 128 has a recess 129 as shown in FIGURE 1, so that the actuator lever 120 can be locked in the upper position by raising it upwardly against the action of the spring 125 and placing the hook 127 in the recess 129.

As the actuator lever 120 is raised from its lower position to its upper locked position when it is desired to temporarily stop the tape, the pause lever 121 is rotated in a counterclockwise direction around a shaft 129. An outwardly extending portion 130 of the pause lever 121 butts against the portion 63 of the lever 60 and forces the lever 60 in a downward direction against the action of the spring 65. This action causes the pinch roller 24 to pull away from the capstan shaft 23 and free the tape. In addition, a wire 131, which is fastened to the pause lever 121 and looped around the yoke portion 79 of the bracket 73, pulls the bracket 73 in the direction of the heads 19 and 20 and applies additional pressure on the tape between the pressure pads 21 and 22 and the heads 19 and 20.

Figure 6:
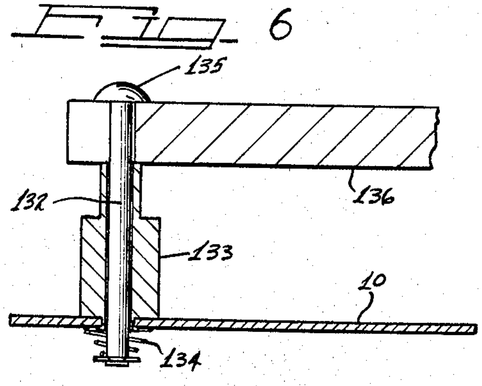
FIGURES 5–7 are views of means for locking a magnetic tape cartridge on the tape recorder.
Figure 5:
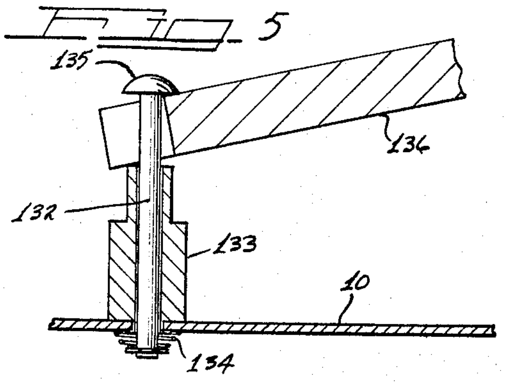

The magnetic tape recorder also includes unique means for locking a tape cartridge in place in the recorder at its record-playback position only. This means includes a two position hold-down pin 132, FIGURES 1, 5 and 6, which is mounted on the deck plate 10. This pin 132 is slidably mounted in a hollow post 133 which is secured to the plate 10. The bottom end of the pin stock protrudes through the plate 10 and a compression spring 134 urges the pin downwardly. When a tape cartridge 136 is inserted into the tape recorder, a U-shaped slot in its lower side is inserted around the pin 132 as shown in FIGURES 5 and 6. An enlarged head 135 on the pin 132 then bears against the upper surface of the cartridge 136 and the force of the spring 134 holds the cartridge in place.

The upper end of the tape cartridge is held in place by means of a hook 137 formed on the lever 60, see FIGURES 1, 3 and 7. The tape cartridge 136 is inserted into the tape recorder when it is at a position other than the record-playback position by first hooking one side of the cartridge 136 on the pin 132 and folding the other end of the cartridge into the tape recorder in such a manner that two holes 138 formed in the cartridge 136 fit over two guide posts 139 and 80. Then, when the tape recorder is switched to its record-playback position, the lever 60 and the pinch roller 24 move toward the capstan shaft 23 and the hook 137 on the lever 60 overlays the cartridge 136, as shown in FIGURE 7, and holds it in place. At any position of the tape recorder other than the record-playback position, the lever 60 and the hook 137 are pulled back so that the cartridge can be easily removed without danger of damaging the tape.

Figure 8:
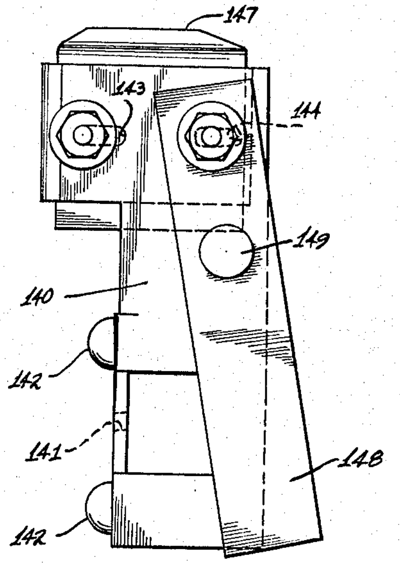
FIGURES 8 and 9 are views of means for adjusting the positions of the heads on the tape recorder.
Figure 9:
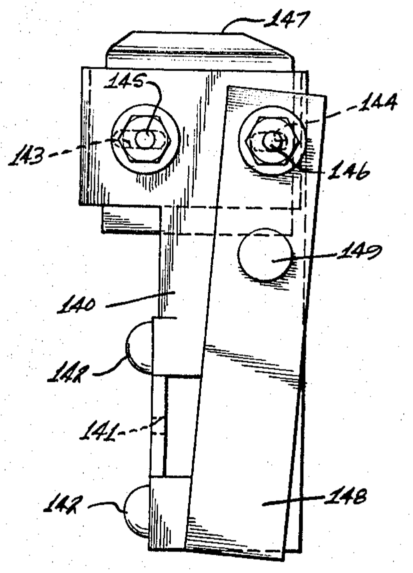

One or more of the heads on the tape recorder may be mounted in the manner shown in FIGURES 8 and 9 so that their positions can be adjusted either toward or away from the deck plate 10. With reference to these figures, a bracket 140 is mounted on the deck plate 10 by inserting screws through holes 141 formed in the bracket 140 and into the deck plate 10. The bracket 140 is spaced from the deck plate 10 a slight amount by stand-offs 142 formed on it. Two elongated slots 143 and 144 are formed in the bracket 40 and receive two screws 145 and 146, respectively, which are fastened to a head 147. A lever 148 is pivotally mounted on the bracket 140 by a pin 149 and an oversized hole formed in the lever 148 is inserted over the screw 146. It can be seen that when the lever 148 is rotated in a counterclockwise direction as seen in FIGURES 8 and 9, the uppermost end of the lever 148 will force the head 147 toward the left, while as the lever 148 is rotated in a clockwise direction the head 147 will move toward the right. The fit between these members is made quite snug so that once the position of a head has been set, it will be held until purposely changed.

Figure 10:
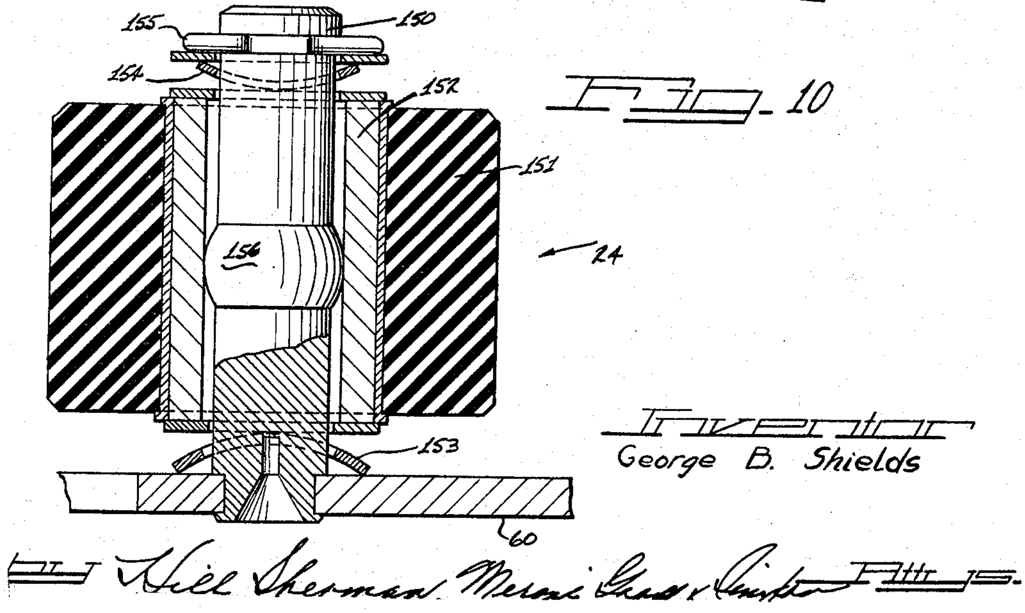
FIGURE 10 is a view of the mounting means for the pinch roller.

The construction of the pinch roller 24, shown in detail in FIGURE 10, is such that it is self-aligning on the capstan shaft 23 when the tape recorder is switched to its record-playback position. The pinch roller 24 includes a shaft 150 which is mounted on the lever 60. A rubber roller 151 is molded to a bearing 152 that is slipped over the shaft 150. A tension washer 153 is fitted between the lever 60 and the bearing 152 and a second tension washer 154 is fitted between a retaining ring 155 and the bearing 152 which hold the bearing in place on the shaft 150.

As can be seen from FIGURE 10 the interior diameter of the bearing 152 is uniform while the exterior diameter of the shaft 150 has an enlarged portion 156 formed at approximately its center section. Therefore, the pinch roller 24 will be free to wobble slightly about the enlarged portion 156 and be able to take a position that is in alignment with the capstan shaft 23 when the tape recorder is switched to its record-playback position.

Figure 11:
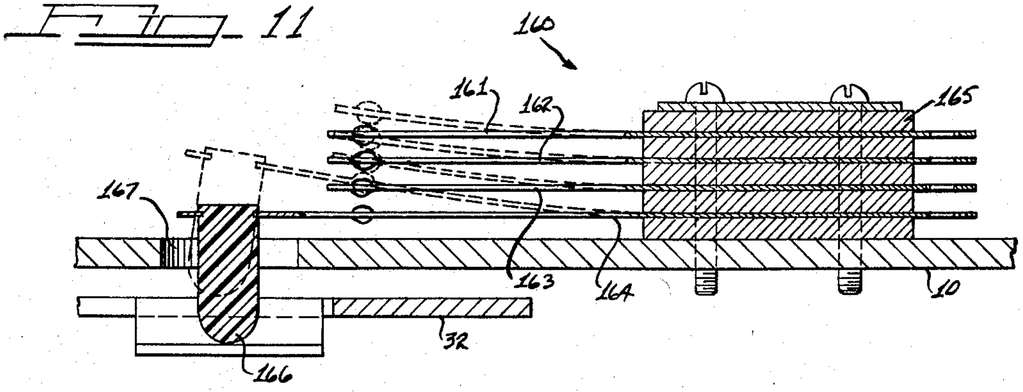
FIGURE 11 is a view of a mute switch and the means for actuating it.

The magnetic tape recorder is also provided with a mute switch 160, Figures 1 and 11. The electrical connections to this switch are to the record-playback heads and the switch is constructed so that it will short out these heads at all positions other than the record-playback position. The switch 160 includes four leafs 161–164 which are mounted in a block 165 of insulating material which in turn is mounted on the deck plate 10. The bottommost leaf 164 is longer than the others and has a knob 166 of insulating material fastened to it. This knob 166 extends through an opening 167 formed in the deck plate 10 and bears against the cam plate 32. The cam plate 32 is formed with two shutters 168 and 169 which are bent outwardly away from the knob 166. The position of these shutters is such that the knob 166 is exactly in between the two shutters when the tape recorder is at the record-playback position. Therefore, the knob 166 will extend the farthest possible distance into the opening 166 and will open the contacts mounted on the leafs 161–164 as shown by the solid lines in FIGURE 11. On the other hand, when the tape recorder is at any other position one of the shutters 168 and 169 will bear against the knob 166 and force it upwardly and close the contacts mounted on the leafs 161–164 as shown in phantom. Therefore, since the leafs 161–164 are connected to the outputs from the heads, these heads will be shorted out whenever the tape recorder is at a position other than the record-playback position.

Figures 12, 13:
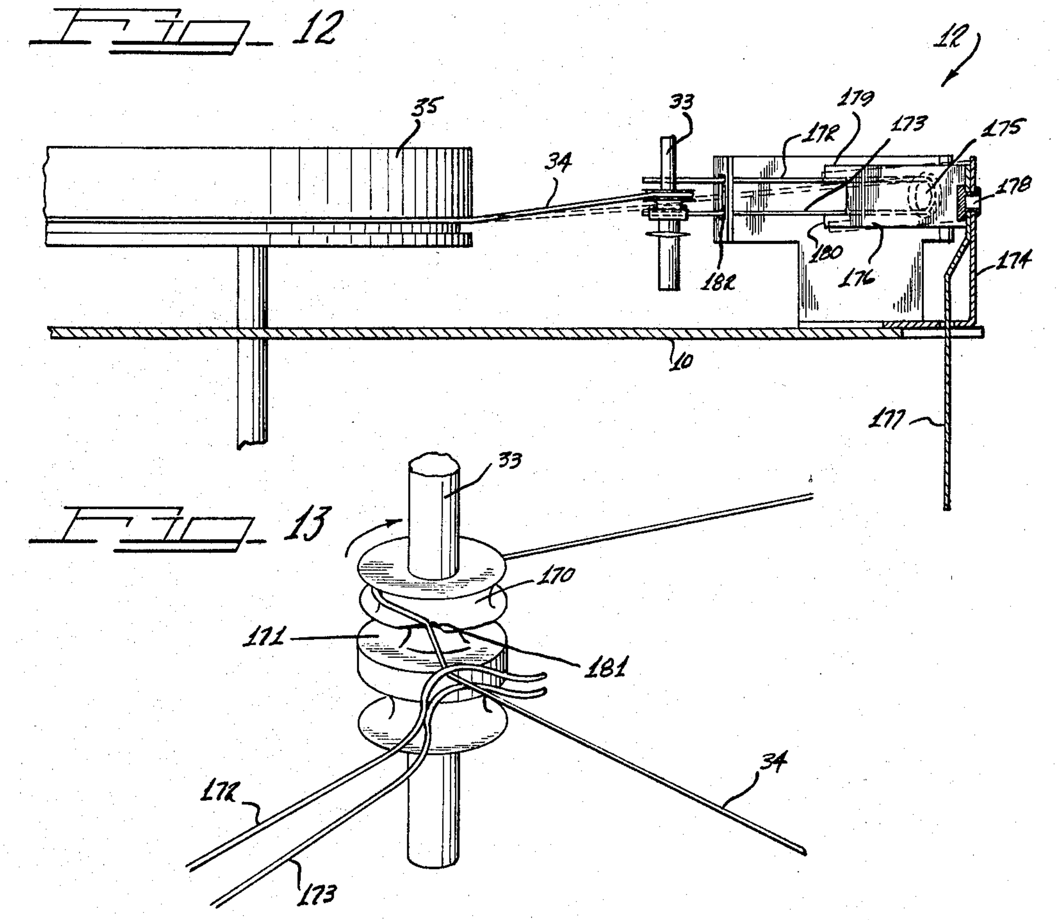
FIGURES 12 and 13 are views of the speed change mechanism for the tape recorder.

FIGURES 12 and 13 illustrate the speed changing mechanism 12 for the tape recorder. As was described previously, the motor shaft 33 is coupled to the capstan flywheel 35 by a flexible drive belt 34. Press fit to the shaft 33 is a two speed drive pulley which has two grooves 170 and 171 which receive the belt 34. The turns ratios of the two grooves is such that one drives the capstan flywheel at twice the speed of the other.

The position of the belt 34 is changed between the two grooves 170 and 171 by means of two flexible wires 172 and 173 which are mounted on a bracket 174. The wires 172 and 173 are fixed to the bracket 174 by a rivet 175 and extends through a guide slot 182 formed in the other end of the bracket 174. Also mounted on the bracket 174 is an actuator 176 which has a handle 177 formed on it. The actuator 176 has two extensions 179 and 180 formed on it which hook on the two flexible wires 172 and 173, respectively. It can be seen that when the actuator 176 is rotated in a first direction around the point of the rivet 178 by turning the handle 177, the wire 172 is forced downwardly and bears against the belt 34 as shown in FIGURE 13. On the other hand, when the actuator 176 is rotated in the other direction the wire 173 bears against the other side of the belt 34 and forces it in the opposite direction.

When it is desired to change the speed of the tape recorder from its high speed to its low speed the actuator 176 is rotated in the first direction so that the wire 172 bears against the upper side of the belt 34. The drive motor shaft 33 and the pulley are normally turning when the speed of the recorder is being changed so that a notch 181 formed in the common wall between the grooves 170 and 171 catches on the drive belt 34 and pulls it downwardly into the groove 171. When the speed is changed from the low speed to the high speed, the wire 173 forces the belt 34 upwardly until it catches on the notch 181 which pulls it into the groove 170.

Another primary advantage of the tape recorder is the fact that the drive belt 34 can be replaced when it is worn without disassembling any of the other parts of the tape recorder. This is possible because the drive motor for the tape recorder is mounted on the motor mounting plate 31 with the motor shaft 33 extending in the direction of the deck plate 10 but not reaching it. There is a gap between the end of the motor shaft 33 and the deck plate 10 so that, when the tape recorder is at its stop position and the shaft 33 is not in contact with either of the wheels 36 and 37, the belt 34 can be removed by slipping it between the shaft 33 and the two wheels 36 and 37 and around the lowermost end of the motor shaft. A new belt can then be installed by reversing this procedure.

The tape recorder further includes a safety switch mechanism 184, FIGURE 1, which automatically turns off the recorder when the end of a tape is reached. The switch is mounted on a bracket 185 and its actuator arm 186 has an outwardly extending finger 187 formed on it. This finger 187 extends through a slot formed in the tape cartridge and senses the end point of a tape. At this point the switch is caused to change its position and turn off the recorder.

It will be apparent that many modifications and variations may be effected without departing from the scope of the novel concepts of the present invention.

I claim as my invention:

1. In a magnetic tape recorder, a deck plate, a capstan extending from said deck plate, a pinch roller supported on said deck plate for movement between an inactive position and an active position in which it is pressed against said capstan, and a lock down mechanism for receiving and supporting a magnetic tape cartridge on said deck plate to position magnetic tape therein between said capstan and said pinch roller, comprising: a shaft mounted on said deck plate and adapted to extend into a slot in one side portion of said cartridge, an enlarged head on said shaft adapted to hold said one side portion of said cartridge against movement away from said deck plate, releasable hook means mounted on said deck plate and arranged for movement between an inactive position and an active position in which it is operative to extend over an opposite edge portion of said cartridge to hold said opposite edge portion of said cartridge against movement way from said deck plate, and means mechanically interconnecting said hook means and said pinch roller for conjoint movement between said inactive and active positions thereof.

2. In a magnetic tape recorder as defined in claim 1, said shaft being slidably mounted on said deck plate for movement in a direction generally normal thereto, and spring means urging said shaft to urge said head toward said deck plate.

3. In a magnetic tape recorder as defined in claim 1, said interconnecting means comprising an arm carrying both said pinch roller and said hook means and pivotal about an axis parallel to the axis of said capstan and generally normal to said deck plate.

4. In a magnetic tape recorder as defined in claim 1, a post on said deck plate adapted to extend through an opening in said opposite edge portion of said cartridge.

References Cited by the Examiner

UNITED STATES PATENTS

| | | | |
|---|---|---|---|
| 1,189,611 | 7/1916 | Morse | 226—192 |
| 1,242,074 | 10/1917 | Thomas | 248—361 |
| 2,021,964 | 11/1935 | Ray | 74—242 |
| 2,262,325 | 11/1941 | Kendall | 226—190 |
| 2,864,894 | 12/1958 | Dale et al. | 179—100.2 |
| 2,868,891 | 1/1959 | Brewster | 170—100.2 |
| 2,914,620 | 11/1959 | Dale | 179—100.2 |
| 2,920,148 | 1/1960 | Munro | 179—100.2 |
| 2,933,319 | 4/1960 | Proctor | 274—11 |
| 2,953,312 | 9/1960 | Munroe | 242—55.12 |
| 2,978,198 | 4/1961 | Bierman | 242—55.12 |
| 2,986,318 | 5/1961 | Tiger | 226—178 |
| 3,060,277 | 10/1962 | Baker et al. | 179—100.2 |
| 3,069,058 | 12/1962 | Haff | 226—187 |

OTHER REFERENCES

"Tape Recorder Manual," volume TR–4, copyright 1959, by Howard W. Sams & Company, Inc. Indianapolis, Indiana (first printing, June 1959), Sec. 30, page 3, and Sec. 36, pages 4 and 9.

BERNARD KONICK, *Primary Examiner.*

STEPHEN W. CAPELLI, *Examiner.*

J. R. GOUDEAU, J. FRANK, T. W. FEARS, *Assistant Examiners.*